United States Patent [19]

Wilcox

[11] Patent Number: 4,592,388
[45] Date of Patent: Jun. 3, 1986

[54] CONNECTOR ASSEMBLY FOR SWIVEL TYPE FAUCET SPOUT

[75] Inventor: Thomas J. Wilcox, East Troy, Wis.

[73] Assignee: Indiana Brass, Inc., Frankfort, Ind.

[21] Appl. No.: 700,280

[22] Filed: Feb. 11, 1985

[51] Int. Cl.⁴ .......................................... F16L 27/00
[52] U.S. Cl. .................... 137/615; 285/276; 285/277; 285/921; 137/801
[58] Field of Search ............... 285/276, 277, DIG. 22, 285/8; 137/801, 615, 580

[56] References Cited

U.S. PATENT DOCUMENTS

| | | | |
|---|---|---|---|
| 1,819,387 | 8/1931 | Robinson | 285/276 |
| 2,021,241 | 11/1935 | Mall | 285/276 |
| 2,468,315 | 4/1949 | Wagner | 285/276 |
| 2,929,406 | 3/1960 | Anderson | 137/615 |
| 3,239,244 | 3/1966 | Leinfelt | 285/276 |
| 4,186,946 | 2/1980 | Snow | 285/276 |
| 4,372,650 | 2/1983 | Lisfeld et al. | 285/276 |

FOREIGN PATENT DOCUMENTS 254151 7/1964 Australia ............................ 285/276

Primary Examiner—A. Michael Chambers
Attorney, Agent, or Firm—Woodard, Weikart, Emhardt & Naughton

[57] ABSTRACT

A connector assembly for connecting a faucet body to a swivel spout. The connector assembly comprises a spout hub fixedly attached to the spout, a spout socket fixedly connected to the faucet body and rotatably received within a through passageway in the spout socket, and a resilient flexible lock ring disposed between the spout hub and spout socket. The lock ring integrally comprises a collar extending at least partially around the spout hub and a pin projecting outwardly from the collar. The lock ring collar is normally inwardly flexed and urges against the interior of the spout socket. The spout socket is provided with a side opening which receives the lock ring pin under urging from the collar. Interference contact between the spout socket and the pin within the side opening serves to limit longitudinal movement of the spout hub inside the spout socket. The connector assembly permits smooth swivel movement of the spout during faucet operation by distributing the area of moving contact between the spout hub and lock ring along the collar.

17 Claims, 7 Drawing Figures

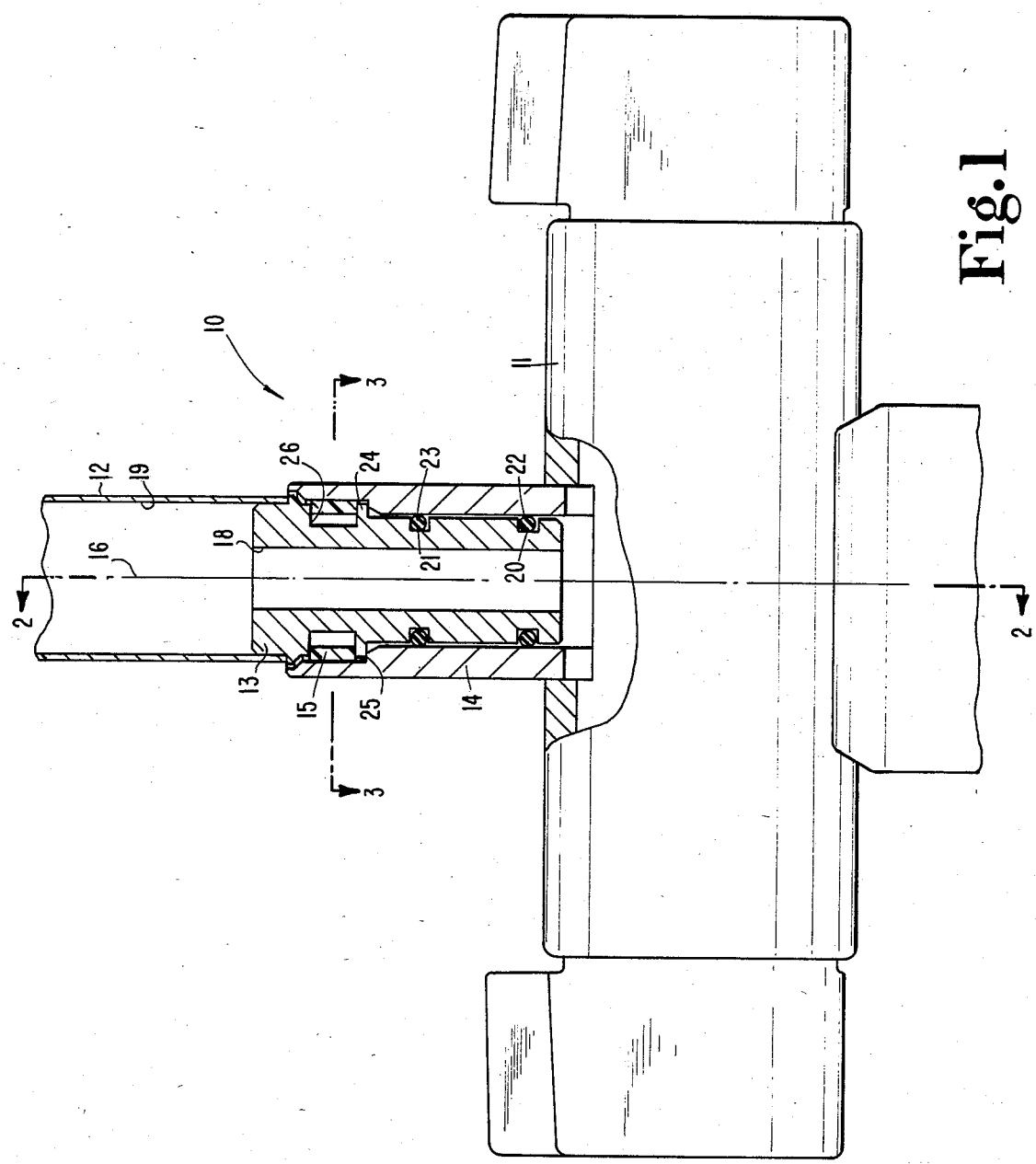

CONNECTOR ASSEMBLY FOR SWIVEL TYPE FAUCET SPOUT

BACKGROUND OF THE INVENTION

The present invention relates generally to the field of connector assemblies for coupling fluid conduits and, more particularly, to a connector assembly for a swivel type faucet spout.

Swivel type faucets have been in use for many years and are quite commonly found in the kitchen of a home. Such faucets are characterized by having a connecting or coupling means for securing the spout to the faucet body which also permits the spout to be freely swivelled during use. While having a strictly functional purpose, there are nevertheless aesthetic considerations involved in the design of the connecting or coupling means, in that such means should not unduly detract from the overall ornamental design of the faucet. Unfortunately, conventional connecting means for swivel spouts often incorporate an externally visible threaded nut which is considered a design detraction from an aesthetics viewpoint.

A less unsightly alternative has been to incorporate a design involving the use of a set screw which is either externally visible or hid from view by a decorative band. The shaft of the set screw projects within an annualar groove or recess on the spout hub, with the spout hub being retained to the faucet body by virtue of interference contact between the set screw shaft and the groove defining surface of the spout hub. This design is suboptimal from a functional standpoint in that water pressure directed through the spout forces the rotating spout hub against the stationary set screw, resulting in a concentration of frictional force against the set screw. If the set screw, spout hub and spout socket are metal, swivelling the spout with the faucet operating will produce an undesirable grinding or abrasive feel. Moreover, such forces can, over a long period of time, work to wear down or weaken the set screw.

SUMMARY OF THE INVENTION

A connector assembly for connecting a faucet body to a swivel spout, according to one embodiment of the present invention comprises a spout hub fixedly attached to the spout and defining a first through passageway in flow communication with the spout. There is further provided a spout socket defining a second through passageway within which the spout hub is rotatably received. The spout socket is mounted to the faucet body so as to permit the spout to swivel relative to the faucet body as the spout hub rotates on the spout socket. The spout socket also includes a side opening communicating between the second through passageway and the exterior of the spout socket. A lock ring is also provided which includes a resilient flexible collar extending at least partially around the spout hub and a pin integrally formed with and projecting outwardly from the collar and sized to be received within the side opening. The collar is normally outwardly biased in a retained position between the spout hub and spout socket and urges against the spout socket along the second passageway thereby urging the pin within the side opening. The lock ring thus serves to limit longitudinal movement of the spout hub relative to the spout socket by interference contact between the spout socket and pin within the side opening while also permitting smooth swivel movement of the spout during faucet operation by distributing the area of moving contact between the spout hub and lock ring along the collar.

Accordingly, it is an object of the present invention to provide an improved connector assembly for a swivel type faucet spout.

It is a further object of the present invention to provide an improved connector assembly for a swivel type faucet spout that is relatively low in cost and simple to manufacture.

A yet further object of the present invention is to provide a connector assembly for a swivel type faucet spout that has an aesthetically pleasing, trim profile and yet provides positive, quick and easy connection and disconnection of the spout from the faucet body.

Another object of the present invention is to provide a connector assembly for a swivel type faucet spout that has a relatively low friction bearing surface that results in smooth spout rotation when water pressure produces end thrust on the spout hub.

Related objects and advantages of the present invention will become more apparent by reference to the following figures and detailed description.

BRIEF DESCRIPTION OF THE DRAWINGS

FIG. 1 is a fragmentary elevational view, partially in section, showing the connector assembly of the present invention mounted in a faucet.

DESCRIPTION OF THE PREFERRED EMBODIMENT

Figure 4:
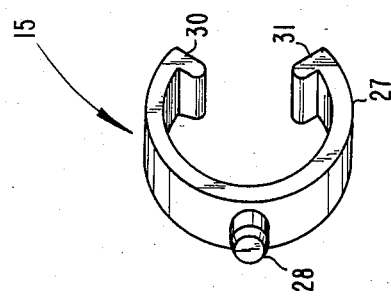
FIG. 4 is a perspective view of the lock ring.
Figure 3:
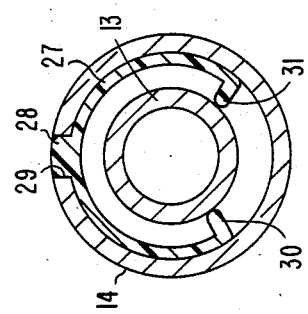
FIG. 3 is a sectional view taken along line 3—3 in FIG. 1 showing the lock ring in its seated position within the spout socket.
Figure 2:
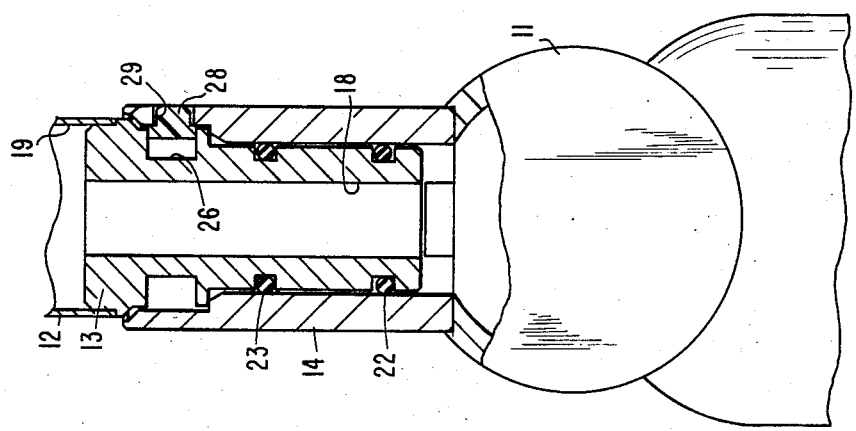
FIG. 2 is a sectional view taken along line 2—2 in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the connector assembly of the present invention is shown generally designated at 10 in FIG. 1 connecting a faucet body 11 to a swivel spout 12. The connector assembly 10 generally comprises: a spout hub 13 fixedly attached to the spout 12; a spout socket 14 fixedly attached to the faucet body 11 and rotatably received within a through passageway in the spout socket 14; and a resilient flexible lock ring 15 disposed between the spout hub and spout socket. The faucet body 11 and spout 12 may be of various conventionally known and suitable constructions, the only constraint being that the spout 12 has a straight vertical section extending from the faucet body which permits the spout to swivel about its vertical center axis 16.

As shown in FIG. 1, spout hub 13 and spout socket 14 are separate members respectively attached to spout 12 and faucet body 11 by a suitable sealing means, such as for example, a solder joint. Alternatively, spout hub 13 and spout socket 14 could be respectively integrally formed with spout 12 and faucet body 11.

Referring to FIGS. 1-4, spout hub 13 has an annular shoulder which defines the solder joint joining spout hub 13 to spout 12 and sealing the flow path between the respective flow passageways 18 and 19 in spout hub 13 and spout 12. A pair of longitudinally spaced apart annular recesses 20 and 21, respectively, receive resilient rubber O-rings 22 and 23 and provide a watertight seal in the space between the spout hub 13 and the spout socket 14. Annular flange 24 cooperates with shoulder 25 and serves as a stop to limit downward movement of the spout hub 13 within the spout socket 14.

Lock ring 15 is received within a relatively large annular recess 26 in spout hub 13 and serves to limit the upward movement of spout hub 13 and retain it in its position within spout socket 14. Lock ring 15 includes a resilient flexible collar 27 extending around the spout hub 13 and a pin 28 integrally formed with and projecting outwardly from collar 27. The collar 27 urges outwardly against the interior of spout socket 14, thereby urging the pin 28 within a side opening 29 in spout socket 14. Thus, the lock ring 15 limits upward movement of the spout hub 13 relative to the spout socket 14 by interference contact between the spout socket 14 and the pin 28 within the side opening 29. The open ends of the collar 27 have radially inwardly projecting legs 30 and 31 which prevent the ends of collar 27 from twisting when the spout hub 13 is inserted in the spout socket 14 during assembly and retains lock ring 15 on spout hub 13. The outer end of the pin 28 is chamfered to allow for slight misalignment between the pin 28 and the opening 29 in spout socket 14.

In the preferred embodiment, lock ring 15 is preferably made from a low friction plastic material, such as for example, type M90-04 Celcon, manufactured by Celanese Plastics Co., a division of Celanese, Corp. of Newark, N.J. Spout hub 13 and spout socket 14 may for example be made of brass.

Assembly of spout 12 to faucet body 11 is accomplished as follows. Spout hub 13 is soldered to spout 12 and spout socket 14 is soldered to faucet body 11. Lock ring 15 is snapped into the large recess 26 of spout hub 13, and O-rings 22 and 23 are inserted over hub 13 into the recesses 20 and 21. Spout hub 13 is then inserted into spout socket 14 with the pin 28 of lock ring 15 aligned with side opening 29. As the spout hub 13 is being inserted, the ends of collar 27 will flex radially inwardly to accommodate pin 28 within recess 26 and then snap outwardly as the pin seats within opening 29. This completes the assembly. To remove the spout from the faucet, it is only necessary to pull upwardly on the spout 12 while pushing inwardly on the pin 28 with any suitable pointed instrument.

Figure 7:
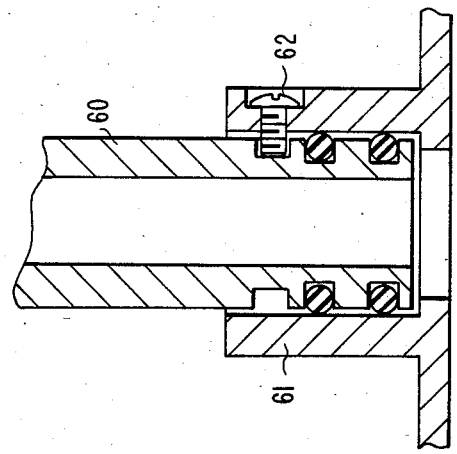
FIGS. 5-7 are fragmentary sectional views of three prior art connector assemblies.
Figure 5:
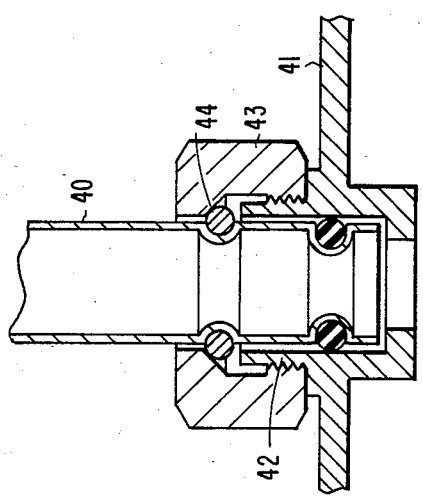
Figure 6:
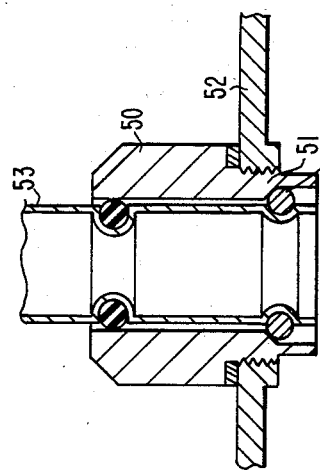

FIGS. 5-7 show various prior art methods for attaching a vertically disposed swivel spout to a faucet body. In FIG. 5, the spout 40 is inserted within a faucet body 41 having a male threaded socket portion 42. A threaded hex nut 43 or knurled ring prevents the spout 40 from moving upwardly out of the socket by interference contact with a retainer ring 44. FIG. 6 shows a similar arrangement except that the hex nut 50 has a male threaded end 51 for mating with female threads in the faucet body 52. The spout 53 is retained within body 52 by the retaining ring 54. In FIG. 7, the spout 60 is inserted within socket portion 61 and retained thereto by a screw 62.

Each of the prior art spout connector assemblies shown in FIGS. 5-7 has disadvantages not characterized by the present invention. For example, it may be appreciated that when water is flowing through the spout there will be an upward thrust tending to lift the spout upwardly out of the socket. If the spout connector assembly is of the type shown in FIG. 7, the spout cannot be swiveled during this condition without producing a grinding noise and abrasive feel caused by frictional contact between the spout and the metal screw. While this can be minimized by using a screw having a nylon or other suitable plastic shaft, there is an unacceptable wear problem due to the concentration of the frictional force at the lowest point along the screw shaft.

While the assemblies shown in FIGS. 5 and 6 address the wear problem by distributing the frictional force around a retainer ring, both of these assemblies require the use of a large threaded nut. Since this nut is exposed to view, the overall design is displeasing from an aesthetics standpoint.

In the present invention, the wear problem is not present because the frictional force caused by swivelling the spout in an upward thrust condition is distributed along the entire bottom surface of collar 27. Thus, lock ring 15 permits smooth swivel movement of the spout 12 despite the presence of a flow condition through the spout 12 which produces an upward thrust on the spout hub 13. This is accomplished without the use of an aesthetically displeasing retaining means, such as the hex nut shown in FIGS. 5 and 6. Moreover, installation and removal is considerably simplified with no special tool being required.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Thus, for example, while the connector assembly 10 is shown connecting a swivel spout to a faucet body, it should be appreciated that the connector assembly 10 may also be useful as a coupling between other types of fluid conduits where it is desirable to provide relative rotation of the conduits about the axis of their connection.

What is claimed is:

1. A connector assembly for connecting a faucet body to a swivel spout, comprising:
    a spout hub fixedly attached to said spout and defining a first through passageway in flow communication with said spout;
    a spout socket defining a second through passageway within which said spout hub is rotatably received, said spout socket connected to said faucet body so as to permit said spout to swivel relative to said faucet body as said spout hub rotates in said spout socket, said spout socket further having a side opening communicating between said second through passageway and the exterior of said spout socket; and
    a lock ring including a resilient flexible collar extending at least partially around said spout hub, said lock ring further including a pin integrally formed with and projecting outwardly from said collar, said collar urging against said spout socket along said second passageway thereby urging said pin within said side opening without said pin extending outwardly of said side opening exteriorly of said faucet, whereby, said lock ring limits longitudinal movement of said spout hub relative to said spout socket by interference contact between said spout socket and said pin within said side opening while also permitting smooth swivel movement of the spout during faucet operation by distributing the area of moving contact between said spout hub and said lock ring along said collar.

2. The connector assembly of claim 1 wherein the ends of said collar have radially inwardly projecting legs and said collar extends more than halfway around said faucet hub.

3. The connector assembly of claim 1 and further comprising:
a sealing means, including a pair of longitudinally spaced apart resilient O-rings, for sealing the space between said spout hub and said spout socket along said second through passageway, said O-rings located between said faucet body and said lock ring.

4. The connector assembly of claim 3 wherein the ends of said collar have radially inwardly projecting legs.

5. The connector assembly of claim 4 wherein said pin tapers inwardly in a direction outwardly of said collar.

6. The connector assembly of claim 4 wherein said collar is at least partially received within an annular recess defined by the exterior surface of said spout hub.

7. The connector assembly of claim 4 wherein said spout socket, spout hub and lock ring are cooperably formed to permit disconnection of said connector assembly by pushing said pin inwardly while simultaneously pulling said spout socket and said spout hub apart.

8. The connector assembly of claim 4 wherein said spout socket defines a shoulder along said second passageway and said spout hub includes an annular flange, said shoulder serving as a stop to limit downward movement of said spout hub within said spout socket.

9. The connector assembly of claim 8 wherein said pin tapers inwardly in a direction outwardly of said collar.

10. The connector assembly of claim 9 wherein said collar is at least partially received within an annular recess defined by the exterior surface of said spout hub.

11. The connector assembly of claim 10 wherein said spout socket, spout hub and lock ring are cooperably formed to permit disconnection of said connector assembly by pushing said pin inwardly while simultaneously pulling said spout socket and said spout hub apart.

12. A connector assembly for coupling a plurality of fluid conduits, comprising:
a hub fixedly attached to a first one of said fluid conduits and defining a first through passageway in flow communication with said first fluid conduit;
a socket defining a second through passageway within which said hub is rotatably received, said socket mounted to a second one of said fluid conduits so as to permit said first fluid conduit to rotate relative to said second fluid conduit as said hub rotates in said socket, said socket further having a side opening communicating between said second through passageway and the exterior of said socket; and
a lock ring including a resilient flexible collar extending at least partially around said hub, said lock ring further including a pin integrally formed with and projecting outwardly from said collar, said collar urging against said socket along said second passageway thereby urging said pin within said side opening without said pin extending outwardly of said side opening to the exterior of said socket, whereby, said lock ring limits longitudinal movement of said hub relative to said socket by interference contact between said socket and said pin within said side opening, said lock ring also permitting smooth rotation of said second fluid conduit relative to said first fluid conduit during a flow condition by distributing the area of moving contact between said hub and said lock ring along said collar.

13. The connector assembly of claim 12 wherein the ends of said collar have radially inwardly projecting legs.

14. The connector assembly of claim 12 and further comprising:
a sealing means, including a pair of longitudinally spaced apart resilient O-rings, for sealing the space between said hub and said socket along said second passageway, said O-rings located between said second fluid conduit and said lock ring.

15. The connector assembly of claim 14 wherein the ends of said collar have radially inwardly projecting legs.

16. The connector assembly of claim 15 wherein said pin tapers inwardly in a direction outwardly of said collar.

17. The connector assembly of claim 16 wherein said collar is at least partially received within an annular recess defined by the exterior surface of said hub.

* * * * *